July 17, 1962

C. C. ANDERSON 3,044,088

ROTATING TIRE CLEANER

Filed July 13, 1960

INVENTOR
CLIFFORD C. ANDERSON
BY 3,044,088
ROTATING TIRE CLEANER
Clifford C. Anderson, 315 11th St., Racine, Wis.
Filed July 13, 1960, Ser. No. 42,701
5 Claims. (Cl. 15—21)

This invention relates to a means of cleaning automobile tires and especially the side wall portions thereof.

Tires having white side walls become scuffed when they are permitted to rub against curbings and become unsightly because of the black streaks embedded thereon. The usual car washing operation fails to remove these marks, and removal of them by the usual method of washing with a hand brush is laborious.

An object of this invention is to provide a convenient and efficient means to clean tire side walls.

Further objects and advantages of the invention will become apparent from a consideration of the following detailed description taken in connection with the accompanying drawing wherein an embodiment is shown. However, it is to be understood that the invention is not limited to the details disclosed but includes all such variations and modifications as fall within the spirit of the invention.

Referring to the drawing.

Figure 1:
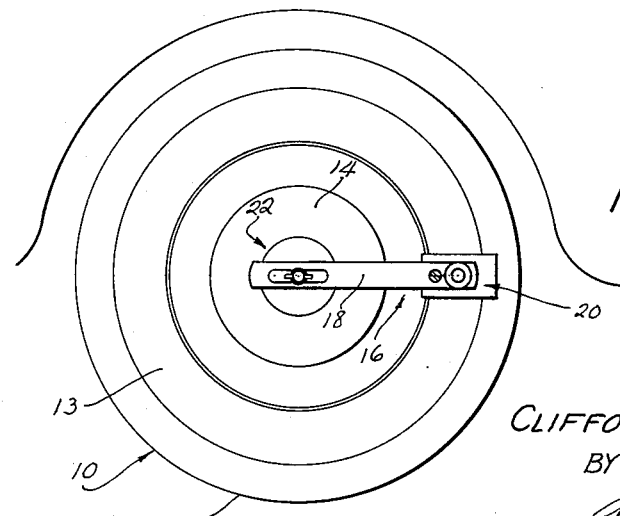
FIG. 1 is a side elevational view of a wheel of an automobile with an embodiment of the invention in position, and ready for use.

Referring again to the drawing, FIG. 1 shows an automobile wheel 10 having a tire 12 with the usual side wall 13, a hub cap 14 and the embodiment of the present invention indicated as 16 in position for use.

Tire cleaner 16 comprises an arm or shank 18, a brush or suitable scrubbing means such as a sponge 20 and a pivot-anchor means 22. Arm 18 is of flexible metal or other suitable material and of a length to permit using the device on tires of all diameters, and which can be bent to accommodate various designs of hub caps and wheels.

Pivot-anchor means 22 is of a diameter sufficient to provide stability when the tire cleaner is being used. Anchor-means 22 comprises a suction cup portion 24 having a shank 26. Shank 26 has a central bore 28. A pivot stud 30 is provided, having an enlarged end 32, preferably of a spherical shape and a reduced portion 33 terminating in a shoulder 34 and threaded as at 35.

Bore 28 is so proportioned that stud 30, when forced into the bore 28 will be held against withdrawal from the latter by virtue of enlarged end 32, but permitted sufficient freedom to turn and to have a "ball joint" action when in use. A washer 36 rests against the shoulder 34 as shown.

Arm 18 is provided with a slot 38 of a width to receive reduced portion 33 freely, and of a length to permit shifting brush or scrubbing means 20 radially to permit the surface of the latter to conform to the contour of various sizes of tires. A washer 40, and a wing nut 42 threaded on reduced portion 33 provides means to fix arm 18 at the desired radial position on cup 24.

Brush or scrubbing means 20 has a body 44 of wood or suitable material, and the usual bristle or cleaning portion 46 of fiber, plastic or other suitable non-corrosive material. The face of the cleaning portion 46 in contact with the tire conforms approximately to the contour of the latter.

Scrubbing means or brush 20 is secured to arm 18 by a screw 48 passing through a hole in the arm and into body 44. A swivel handle 50 is positioned centrally with body 44 so as to be symmetrical with brush or scrubbing means 20 to assure uniform pressure on the bristles or cleaning portion 46. A stud 52 having a woodscrew thread, in this instance, is inserted in a hole in arm 18 and threaded into body 44. Handle 50 is a free fit so as to swivel on stud 52, and a nut 54 engages a thread on stud 52 so as to retain handle 50 thereon.

Figure 3:
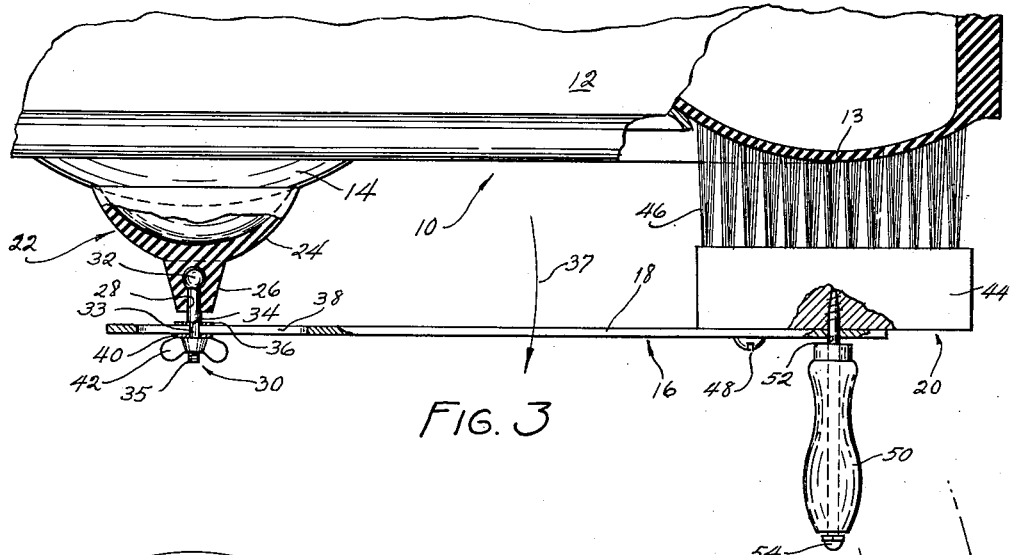
FIG. 3 is a view of the invention taken at 3—3 of FIG. 2.
Figure 2:
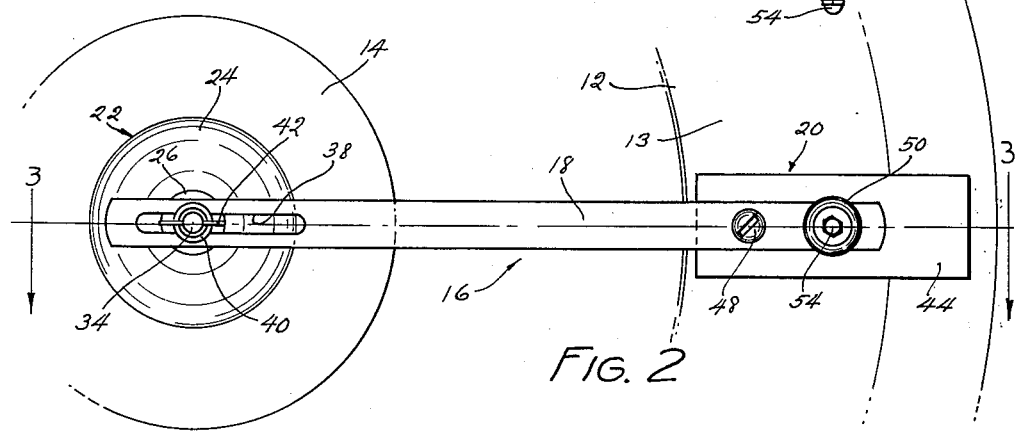
FIG. 2 is an enlarged view of a portion of FIG. 1.

When the tire cleaner of this invention is to be used, the suction cup portion 24 of anchor means 22 is secured to the hub cap 14 by applying sufficient pressure in a manner well known. The arm 18 is then adjusted radially on stud 30 until the cleaning portion 46 of brush 20 is positioned to conform to the contour of side wall 13 of tire 12, as shown in FIG. 3. If necessary, arm 18 can be bent so as to bring portion 46 of brush 20 into proper contact with tire 12 to accommodate various conditions, as some hub caps protrude outwardly further than others.

At periods during the tire cleaning operation, the scrubbing means is supplied with detergents, soap or scouring powder by holding the device by handle 50 and swinging it outwardly about end 32 as a pivot in the direction indicated by the arrow 37 of FIG. 3. The scrubbing means or brush 20 is then returned into engagement with the tire 12 to continue the washing operation.

When washing a tire with the novel invention described herein, the anchor means or suction cup 24 is affixed as described, to the hub cap 14. The scrubbing means 20 is charged with scouring powder, detergent or other cleaning material and the handle 50 is grasped by hand. While exerting pressure toward the side wall of tire 12, the scrubbing means is made to travel about the side wall until the scuff marks have been removed.

The above being a complete description of an illustrative embodiment of the invention, what is claimed as new and desired to be secured by Letters Patent of the United States is:

1. A tire cleaning means for a wheel having a hub cap and a tire having an annular side wall, in combination an anchor means adapted to be attached centrally to said hub cap, a pivot means on said anchor means, a radial arm radially-adjustable on said pivot means and a scrubbing means on said arm in position to contact said side wall and travel annularly as said arm is swung about said pivot means.

2. A tire cleaning means for an automobile wheel having a hub cap and a tire having a side wall, in combination an anchor means adapted to adhere centrally to said cap and provided with a pivot means therein, an arm extending radially, and a scrubbing means secured to said arm, spaced from said pivot means and adapted to engage said side wall and means to adjust said scrubbing means radially relative to said pivot means.

3. A tire cleaning means for an automobile wheel having a hub cap and a tire having a side wall, in combination a pivot means adapted to be anchored on said hub cap at the center thereof and having a stud resiliently mounted thereon, a radially-extending arm on said stud radially adjustable relative to said center, a scrubbing means on said arm spaced radially from said anchor means and adapted to engage said side wall and a handle means on said arm adjacent said scrubbing means to swing said means in the path of said wall and about said pivot.

4. A tire cleaning means for a wheel having a hub cap and a tire having an annular side wall, in combination a pivot anchor means adapted to be suctionally secured to said cap and having a flexible shank, a stud in said shank having a shoulder portion and a threaded portion, an arm extending radially of said wheel and having a longitudinal slot embracing said stud and radially adjustable relative to said stud and contacting said shoulder, a threaded nut on said threaded portion to secure said arm in a selected radial position against said shoulder, a scrubbing means on said arm and adapted to engage said side wall, and handle means on said arm adjacent said scrubbing means to facilitate swinging the latter about said stud so that said scrubbing means follows said side wall.

5. A tire cleaning means for a wheel having a hub cap and a tire having an annular side wall, in combination an anchor means adapted to be attached centrally to said hub cap, a pivot means on said anchor means, a radial arm on said pivot means and a scrubbing means on said arm in position to contact said side wall and to travel annularly as said arm is swung about said pivot means.

References Cited in the file of this patent
UNITED STATES PATENTS

| | | |
|---|---|---|
| 2,288,429 | Baughn | June 30, 1942 |
| 2,832,085 | Chamberlain | Apr. 29, 1958 |